April 15, 1941.                    R. C. CROSS                       2,238,158
                       FLOAT-ACTUATED VALVE FOR FLUSH TANKS
                              Filed Oct. 24, 1940

INVENTOR
ROLAND C. CROSS

Patented Apr. 15, 1941

2,238,158

UNITED STATES PATENT OFFICE 2,238,158

FLOAT-ACTUATED VALVE FOR FLUSH TANKS

Roland Claude Cross, Bath, England

Application October 24, 1940, Serial No. 362,644

5 Claims. (Cl. 137—104)

This invention relates to float-actuated valves for flush tanks and the like and more particularly to valves of the type in which two floats are provided, one of the said floats being operative to close the valve and the second float being arranged to release the first mentioned float when the water has risen to a certain height so that the valve remains fully open until the water reaches a required high level. This ensures a speedy re-filling of the tank.

The object of the invention is to provide an improved arrangement of mechanism of the type referred to which shall be of simple construction and reliable in action, and which, moreover, whilst ensuring rapid and silent re-filling of the tank, will close the valve rapidly without any sudden and concussive action when the high level has been reached.

According to the invention, the float-actuated valve device includes a valve, a main float mounted on a pivoted arm for actuating the valve, a balance weight associated with the arm and arranged to move the main float and its said arm past a dead centre position when the float falls to a predetermined low level for the purpose of retaining it at said low level, an auxiliary float movable independently of the main float, a releasing element controlled by said auxiliary float and adapted to engage the main float arm to release it through dead centre when the auxiliary float reaches a predetermined high level, the valve remaining fully open until closed by the rise of the main float on such release by the releasing element, and damping means associated with the main float and its arm to retard its upward swing and avoid a concussive closing of the valve.

Figure 1:
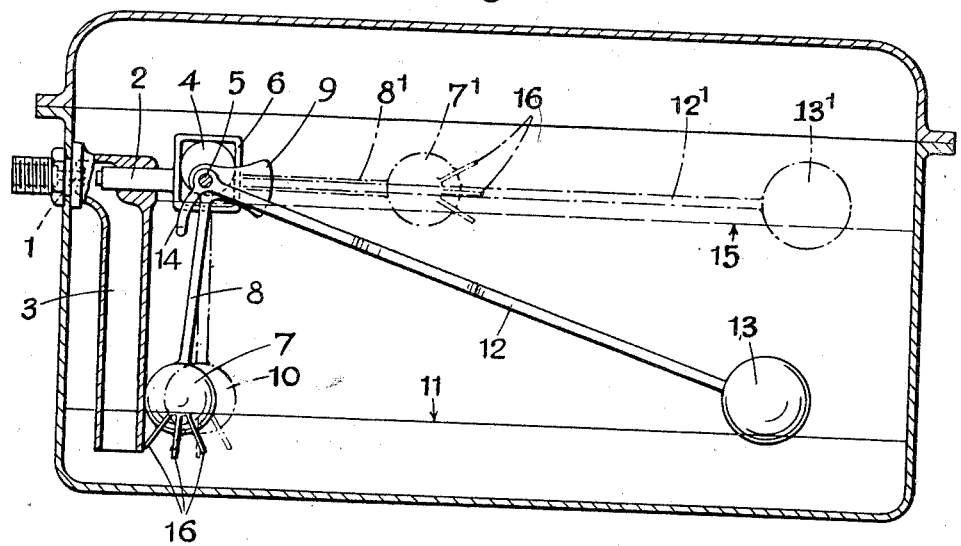
Figure 2:
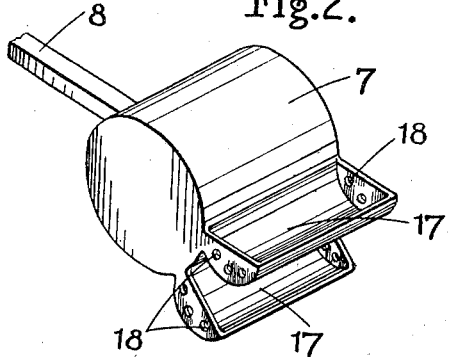
Figure 3:
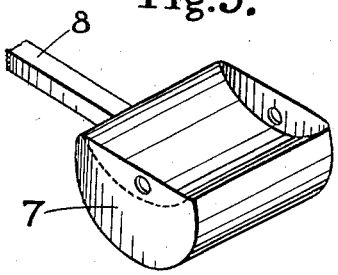
Figure 4:
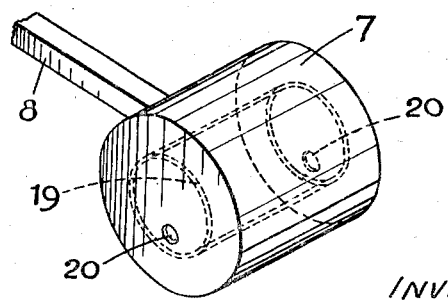

The invention will be more readily understood from the following description of a preferred embodiment with reference to the accompanying drawing in which there is shown in Figure 1 a longitudinal section through a flush tank fitted with a float-controlled valve constructed according to the invention. Figures 2, 3 and 4 show modified forms of float described later.

Referring to the drawing, the water enters the tank through the valve seat member 1, controlled by the valve member 2, and passes into the tank proper through the down pipe 3. The valve member 2 is actuated by an eccentric 4 mounted on a rockable shaft 5 and engaging in a crosshead 6 secured to the valve member 2. Any other method of operating the valve by the part-rotation of shaft 5 may be adopted. The main or valve operating float 7 is mounted at one end of an arm 8, the other end of which is secured fixedly to the shaft 5. The said shaft 5 to which the arm 8 is connected is provided with a balance weight 9, which moves the float 7 past a dead-centre position indicated at 10 as soon as the water level in the tank reaches a predetermined lower level indicated at 11. The weight 9 moves the float 7 in a direction corresponding to the opening of the valve member 2. Loosely mounted on the shaft 5 there is one end of an arm 12, which carries an auxiliary float 13 at its free end. The arm 12 is provided with a releasing element conveniently in the form of a lever 14 which is capable of moving the float 7, by acting on its arm 8, past the dead-centre position 10 in a direction corresponding to the closing of the valve member 2 when the water in the tank rises to a predetermined upper level indicated at 15.

The parts assume the positions shown in full lines in the drawing when the water in the tank is substantially at the level 11. The valve being open water enters the tank and acts on the valve operating float 7 in a direction corresponding to the opening of the valve and presses it into a position limited by any suitable stop, such as the down pipe 3 in the drawing. Thus the float 7 cannot be moved by the rising water in a direction to close the valve member 2 and thus the inlet valve remains wide open and the water enters the tank freely. However, the auxiliary float 13 is caused by the water to rise, its lever 14 gradually approaching the arm 8 of the float 7. When the water in the tank and therewith the auxiliary float 13 reach substantially the upper level 15, see the dotted position 12′, 13′, the lever 14 acts upon the arm 8 and thus moves the float 7 past the dead-centre position 10, whereupon the float 7 is released to rise under the action of the buoyant effort of the water into the dotted position 7′ with the arm at 8′, thereby shutting the valve member 2 almost instantaneously. It will be readily appreciated that when subsequently the water is drained from the tank both floats 7 and 13 fall and that as soon as the level 11 is reached the weight 9 moves the float 7 into the position shown in full lines in the drawing whereupon the operation described is repeated.

In order to prevent the main float 7 rising too rapidly and thereby shutting the valve 2 with sudden shock which would give rise to a concussive and shuddering action, damping means are associated with the main float 7. In Figure 1 a plurality of radial vanes 16 are fixed to the float, and press on the water during the rise to retard the upward movement. On reaching the level 15 the water drains away from the higher vanes 16, giving increased buoyancy to the float so that it can hold the valve in its closed position.

In Figure 2 the vanes are constructed as scoops 17, and the scoops have drain holes 18 whereby any water carried above the level 15 runs away so as to increase the buoyancy of the float 7 and secure a proper closing of the valve 2. In Figure 4 the float 7 is formed with an interior water compartment 19 with drain holes 20 which gives the same effect as the scoops 17.

I claim:

1. A float-actuated valve device including a valve, a main float mounted on a pivoted arm for actuating the valve, a balance weight associated with the arm and arranged to move the main float and its said arm past a dead centre position when the float falls to a predetermined low level for the purpose of retaining it at said low level, an auxiliary float movable independently of the main float, a releasing element controlled by said auxiliary float and adapted to engage the main float arm to release it through dead centre when the auxiliary float reaches a predetermined higher level, the valve remaining fully open until closed by the rise of the main float on such release by the releasing element, and damping means associated with the main float and its arm to retard its upward swing and avoid a concussive closing of the valve.

2. A float-actuated valve device including a valve, a main float mounted on a pivoted arm for actuating the valve, a balance weight associated with the arm and arranged to move the main float and its said arm past a dead centre position when the float falls to a predetermined low level for the purpose of retaining it at said low level, an auxiliary float movable independently of the main float, a releasing lever carried by and movable with said auxiliary float and adapted to engage the main float arm to release it through dead centre when the auxiliary float reaches a predetermined higher level, the valve remaining fully open until closed by the rise of the main float on such release by the releasing lever, and a plurality of radial vanes fixed on the main float to retard its upward swing and avoid a concussive closing of the valve.

3. A float-actuated valve device including a valve, a main float mounted on a pivoted arm for actuating the valve, a balance weight associated with the arm and arranged to move the main float and its said arm past a dead-centre position when the float falls to a predetermined low level for the purpose of retaining it at said low level, an auxiliary float movable independently of the main float, a releasing element controlled by said auxiliary float and adapted to engage the main float arm to return it through dead-centre when the auxiliary float reaches a predetermined higher level, the valve remaining fully open until closed by the buoyancy of the main float on its release by the releasing element, and a scoop attached to the main float to retard its upward swing and avoid a concussive closing of the valve, said scoop having drain-off holes to increase the buoyancy of the main float on reaching the high level.

4. A float-actuating valve device including a valve actuated by a cam on a rockable shaft, a main float mounted on an arm fixedly mounted on said shaft, a balance weight fixed on the shaft and arranged to move the main float and its said arm past dead centre position when the float falls to a predetermined low level for the purpose of retaining it at said low level, the cam on said shaft then fully opening the valve, an auxiliary float movable independently of the main float and mounted on an arm loosely swingable on the rockable shaft a releasing element controlled by said auxiliary float and adapted to engage the main float arm to return it through dead centre when the auxiliary float reaches a predetermined higher level, the valve remaining fully open until closed by the buoyancy of the main float on its release by the releasing element, and damping means associated with the main float and its arm to retard its upward swing and avoid a concussive closing of the valve.

5. A float-actuated valve device including a valve actuated by a cam on a rockable shaft, a main float mounted on an arm fixedly mounted on said shaft, a balance weight fixed on the shaft and arranged to move the main float and its said arm past a dead-centre position when the float falls to a predetermined low level for the purpose of retaining it at said low level, the cam on said shaft then fully opening the valve, an auxiliary float movable independently of the main float and mounted on an arm loosely swingable on the rockable shaft, a releasing element controlled by said auxiliary float and adapted to engage the main float arm to return it through dead-centre when the auxiliary float reaches a predetermined higher level, the valve remaining fully open until closed by the buoyancy of the main float on its release by the releasing element, and a scoop device fixed to the main float to retard its upward swing and avoid a concussive closing of the valve, said scoop device having drain-off holes to empty it automatically and increase the buoyancy of the main float on reaching the high level.

ROLAND CLAUDE CROSS.